April 22, 1930.  K. E. PEILER  1,755,792
FEEDING MOLTEN GLASS
Filed Nov. 7 1924   3 Sheets-Sheet 1
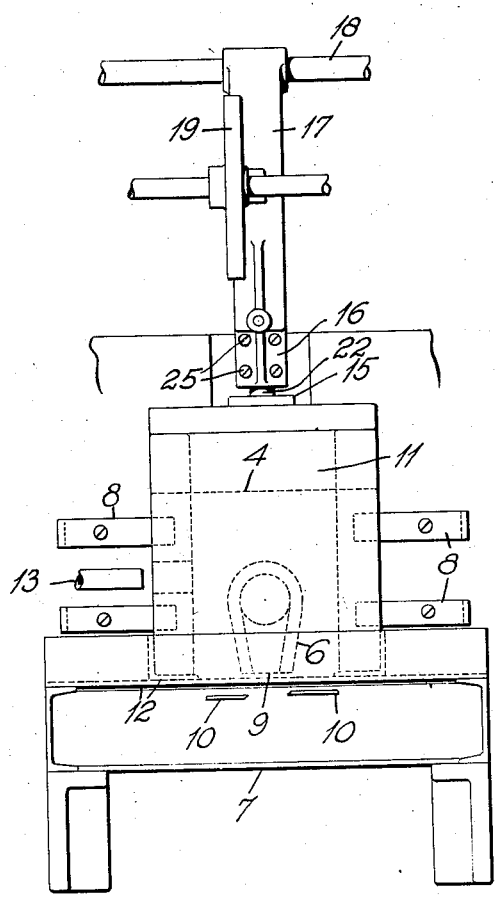
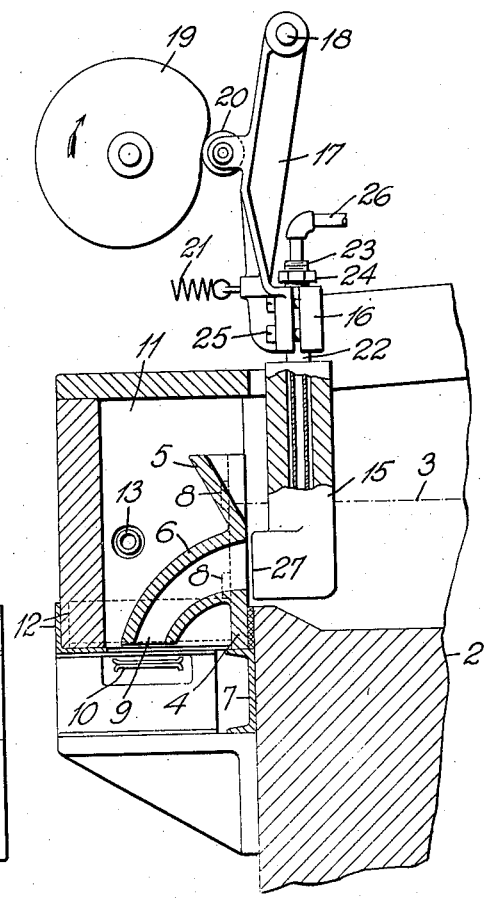
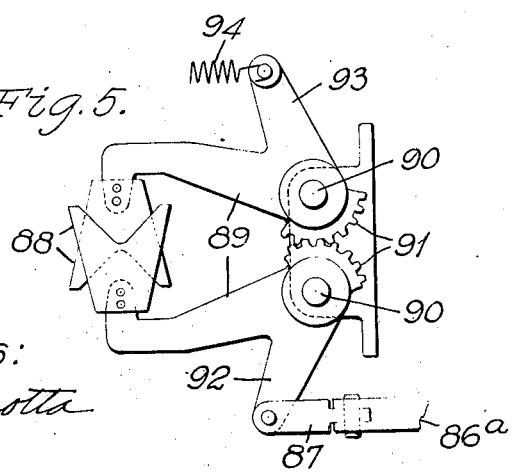
Witness:
S. S. Grotta
Inventor:
Karl E. Peiler
by Wm H Honiss
Atty.

April 22, 1930.    K. E. PEILER    1,755,792
FEEDING MOLTEN GLASS
Filed Nov. 7, 1924    3 Sheets-Sheet 2
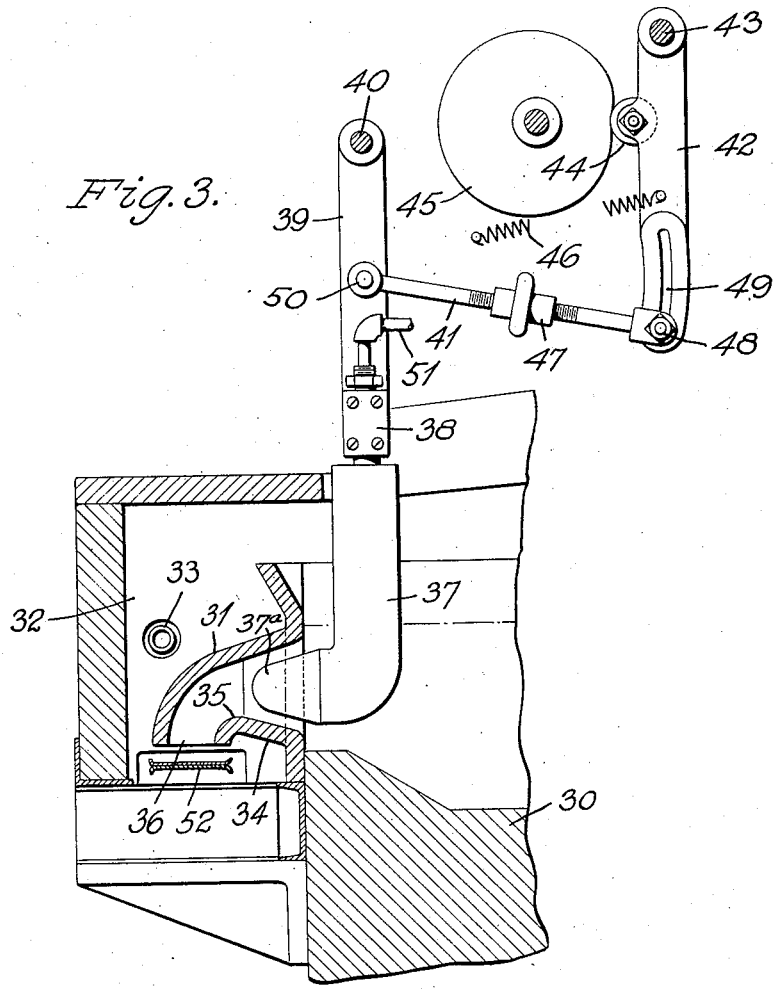
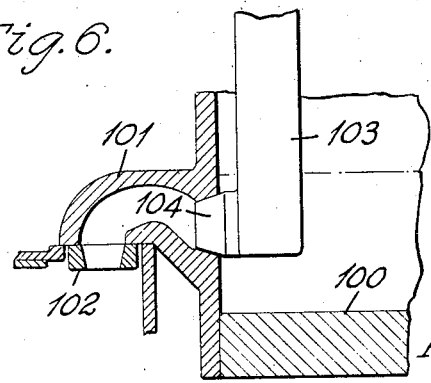
Witness:
S. S. Grotta
Inventor:
Karl E. Peiler
by W. H. Honiss
Atty.

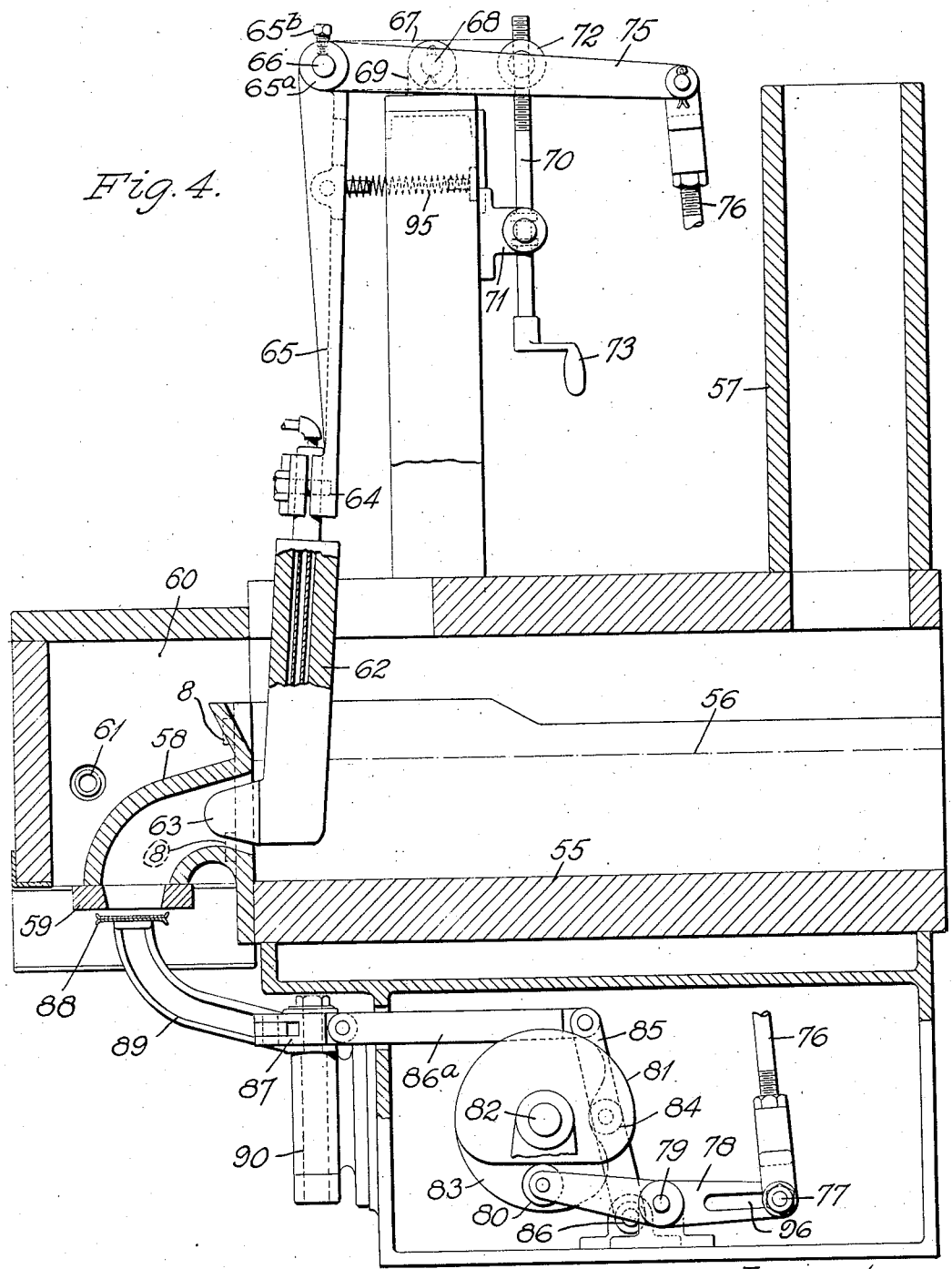

Patented Apr. 22, 1930

1,755,792

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

FEEDING MOLTEN GLASS

Application filed November 7, 1924. Serial No. 748,306.

My invention relates to the art of feeding molten glass in compact, homogeneous mold charges suitable for molding, pressing or other glass-shaping operations.

The object of my invention is to provide a simple and effective system of feeding glass which shall have few moving parts and which shall be adapted to apply to the issuing glass alternate expelling and retracting impulses, having the effect of delivering the glass through an outlet in periodic discharges, each of which is at least equal to a mold charge.

According to the present invention, the glass is placed in a container, which may be a melting furnace, a forehearth connected to a melting furnace, or any other suitable receptacle. The container is provided with a lateral discharge outlet submerged by the molten glass, and a discharge spout is connected to receive the glass through this lateral outlet and to deliver the glass through a downwardly opening orifice outside of the glass container. An impeller is mounted to reciprocate in the glass in the container toward and from the lateral discharge outlet, so as to apply periodic expelling impulses to the glass at the outlet, these expelling impulses being alternated with retractive impulses produced by the movement of the impeller away from the outlet. The impeller thus causes glass to be discharged periodically from the outer end of the spout, and mold charges are severed from the discharged glass by means of suitable shears.

Other novel features of the present invention relate to the specific construction of the spout as a closed channel which is curved outwardly and downwardly and may be of slightly decreasing diameter; the provision of means for keeping the spout at a suitably elevated temperature; and the construction and manner of operation of the impeller. These and other features of my invention will be explained in detail in connection with the accompanying drawings, in which:

Figure 1 is a longitudinal vertical sectional view of a glass feeder constructed in accordance with my invention;

Fig. 2 is a front elevational view of the structure shown in Fig. 1;

Fig. 3 is a longitudinal vertical sectional view showing a modified construction;

Fig. 4 is a longitudinal vertical sectional view showing a further modification;

Fig. 5 is a plan view of the shear mechanism shown in Fig. 4; and

Fig. 6 is a partial vertical sectional view showing a still further modification.

In Figs. 1 and 2 of the drawing, the numeral 2 indicates a portion of a receptacle for molten glass, in which the glass level is shown at 3. The receptacle 2 has a lateral outlet, adjacent to which is set a spout block 4 which may suitably consist of a rectangular block of fire clay, and which may have an outwardly flaring upper portion, as shown at 5.

The spout block 4 carries a spout 6, which, as shown, is formed integral with the block 4, but which may be formed separate from the block 4 and attached thereto in any suitable manner. The spout block 4 rests upon a support 7, which may be one of the channels forming the iron work of the melting furnace or the other receptacle, and clamps 8 are provided for securing the spout block 4 in position against the outer wall of the receptacle 2.

The bore of the spout 6 communicates with the glass in the receptacle 2, and curves outwardly and downwardly, as shown in Fig. 1, terminating in an outlet opening 9 below which are mounted shears 10 for severing mold charges from the glass discharged from the outlet 9. These shears may be constructed and operated in any desired way, according to approved glass-feeding practice. One suitable shear-structure will be described below.

For the purpose of maintaining the spout 6 at the proper temperature to convey the glass without substantially chilling it, the spout may be enclosed in a heating chamber 11, suitably constructed of refractory insulating blocks, resting on suitable supports 12. Flame from a burner 13 may be directed into the spout chamber 11, or this chamber may be otherwise heated or cooled, as desired.

In order to control the passage of glass through the spout 6, an impeller 15 is mounted within the receptacle 2 and is arranged to be reciprocated periodically toward and away from the inlet end of the spout 6. As shown in Figs. 1 and 2, the impeller 15 is suspended from a chuck 16 carried by a hanger 17 which is adapted to swing upon a horizontal pivot 18, and is reciprocated lengthwise by any suitable means, such for example, as a cam 19, a cam roller 20, and a spring 21. The impeller 15 is provided with a shank 22 extending through the chuck 16 and having a screw-threaded portion 23 to which is applied an adjusting nut 24. The shank 22 may be clamped in adjusted position by means of set screws 25, and by this arrangement the impeller 15 may be adjusted accurately with respect to the inlet opening of the spout 6. The impeller may be cooled by means of air, water or other fluid which is circulated through the interior of the impeller by means of suitable pipes, one of which is shown at 26.

The parts should preferably be so adjusted that the working surface 27 of the impeller is parallel to and spaced from the inner surface of the spout block 4 when the impeller is in the forward position shown in Fig. 1. The movement of the impeller away from its seat may be either in a curved path, as herein shown, or may be made rectilinear by mounting the impeller on suitable slides, instead of rocking it about a fixed pivot. It is not believed necessary to illustrate this modified construction herein.

In operating the apparatus described above, the glass is brought to the discharge outlet of the receptacle 2 at suitable temperature and viscosity for feeding, and the impeller 15 is reciprocated periodically toward and from the spout block 4. As the impeller advances, it drives glass ahead of it and causes the glass to be expelled in a compact mass from the lower end of the spout 6. On the reverse movement of the impeller, the glass at the outlet of the spout 6 is strongly retracted into the spout, thus producing a retardation or retraction of the glass at the outlet 9 of the spout, and the operation is repeated in regular cycles, each discharged mass of glass being cut off by the shears 10. The severing operation may take place either before, during or after the retraction mentioned above, and each mold charge, when severed by the shears, drops into a mold or upon a chute or other transfer device which conveys the glass to the mold.

The space between the impeller 15 and the portion of the spout block that is located above the inlet end of spout enlarges upwardly from substantially the level of the upper edge of the spout inlet to a plane well above the glass line by reason of the outward flare or inclination of the portion 5 of the spout block, thus obviating such compacting or pressing of glass between the body of the impeller and the upper portion of the spout block on the forward movement of the impeller, as would tend to cause "strings" and "blisters" in the mold charges subsequently formed of such glass.

The retardation or retraction of the glass, produced by the rearward movement of the impeller may be sufficient to produce an attenuation or necking-in of the glass just below the outlet of the spout; or the retardation may only check the discharge of the glass, without attenuating the glass prior to severance, and may be continued sufficiently to support or lift the glass above the severing plane while the shears are closed.

The amplitude of the stroke of the impeller, and also its speed of movement, may be adjusted to vary the amount of glass propelled through the spout 6 at each stroke of the impeller, and the speed of the impeller may also be caused to vary in different parts of its cycle of movement. For example, the impeller may be made to move forward more quickly than it moves rearwardly, and either the forward or the rearward stroke may be composed of two or more stages, so as to produce any desired effects. These adjustments may be conveniently obtained by providing the cam 19 with changeable or adjustable lobes by which the contour of the cam may be changed at will to give the impeller any desired stroke.

Fig. 3 of the drawing shows a construction which differs from that of Figs. 1 and 2 in that the impeller has a rounded end which enters the discharge spout, and also in that a different driving arrangement is employed. As shown in this figure, the container for the glass is indicated at 30, and the glass in the container communicates with a spout 31 enclosed within a heated chamber 32 which is heated by means of a burner 33. The spout 31 differs from the spout 6 shown in Figs. 1 and 2 in that its lower wall 34 is inclined upwardly and provides a lip or dam 35 over which the glass flows to the spout outlet 36.

The impeller 37 shown in Fig. 3 has a rounded nose 37ª which projects laterally from the lower end of the impeller, and this projecting nose is adapted to enter the inlet of the spout 31 when the impeller is in its forward position, as shown in Fig. 3. By thus entering the spout, the impeller exerts stronger propulsive and retractive impulses upon the glass than the form of impeller shown in Fig. 1, the inlet portion of the spout acting as a well, and the impeller cooperating with this well after the manner of the plunger of a glass feeder of the plunger type, such as is shown for example in my co-pending application for Letters Patent Serial No. 683,576, filed Dec. 31, 1923.

The impeller 37 is suspended from a chuck 38 carried by a hanger 39 which swings around a horizontal pivot 40 and is connected by means of a link 41 to a lever 42 which is pivoted at its upper end on a horizontal pivot 43, and which carries a cam roller 44 engaging a cam 45. A spring 46 serves to hold the roller 44 in contact with the cam 45. The length of the link 41 is adjustable by means of a turn-buckle 47, so as to change the forward position of the impeller. The outer end of the link 41 is connected to the lever 42 by means of a bolt 48 which is adjustable in a curved slot 49 that is concentric with the forward pivot 50 of the link 41 when the impeller is in its forward position. By adjusting the position of the bolt 48 in the slot 49, the amplitude of the stroke of the impeller 37 may be varied, as desired. Other variations in the amplitude and speed of the impeller may also be obtained by providing the cam 45 with adjustable lobes, in the manner described above in connection with the cam 19 of Fig. 1. Air or other cooling fluid may be circulated through the impeller 37 through suitable pipes, one of which is shown at 51.

The apparatus of Fig. 3 operates in the same general manner as the apparatus of Figs. 1 and 2 which has already been described, with the addition that, at each forward stroke of the impeller, a portion of the glass is confined between the nose 37ª of the impeller and the inlet portion of the spout 31, and the forward impulse imparted to the glass is thereby increased. Shears 52 are operated in timed relation to the movement of the impeller 37 to sever mold charges from each discharge of glass which issues from the outlet 36. On the rearward movement of the impeller, the glass in the spout 31 is retracted, and the force of this retraction may be so selected as to produce a retardation or retraction of the glass at the outlet 36, either before, during or after severance of the glass.

The structure shown in Figs. 4 and 5 resembles that of Fig. 3 in the general construction of the impeller and the spout, but differs from the preceding figures in the specific arrangement employed for oscillating the impeller. This figure also shows connections for operating the shears in timed relation to the movement of the impeller, together with certain other details of construction, which will be pointed out below. In Fig. 4 the numeral 55 indicates the glass container in which the glass stands at the level 56. As shown, the container 55 is a forehearth which may be connected to a melting tank furnace, in which case a suitable gate may be provided for controlling the flow of glass from the furnace into the forehearth. A stack 57 may be provided for drawing off combustion gases from the receptacle 55, and this stack may be provided with suitable dampers. The forehearth is shown somewhat diagrammatically, the usual arrangements for controlling the temperature of the glass in the forehearth being omitted.

At the discharge end of the forehearth 55 is a spout 58 similar to the spout 31 of Fig. 3, except that a removable orifice ring 59 is provided at the lower end of the spout 58 for changing the effective size of the spout outlet, and also for ready replacement when the outlet becomes worn. As in the preceding figures of the drawing, the spout is surrounded by a heating chamber which is indicated at 60, and is heated by means of a burner 61.

An impeller 62 having a projecting nose 63 is suspended in operative relation to the inlet of the spout 58 by means of a chuck 64 carried by a hanger 65 that is secured at its upper end to a pivot pin 66 which is mounted at one end of a bracket arm 67. The bracket arm 67 is pivoted at 68 upon a stationary bracket 69 and is adjustable around its pivot 68 to change the vertical position of the pivot pin 66, and consequently the vertical position of the impeller 62. For the purpose of thus adjusting the bracket arm 67, a vertical screw 70 is supported and held against vertical movement in a stationary bracket 71 and the screw-threaded portion of the screw 70 extends through a nut which is mounted to rock in a bearing 72 carried by the bracket arm 67. When the screw 70 is turned by means of a handle 73, the bracket arm 67 is rocked on the pivot 68, thereby adjusting the vertical position of the impeller 62. The impeller may thus be brought into axial alignment with the inlet of the spout 58, or may be displaced somewhat above or below this axial alignment to compensate for irregularities in the flow of the glass, or to produce particular effects in the discharge of the glass. The impeller may also be adjusted laterally along the shaft 66. For this purpose the hanger 65 is held in position by means of collars 65ª that are adjustably secured to the shaft 66 by means of set screws 65ᵇ.

The hanger 65 is rocked periodically on its pivot 66 by means of a lever 75, the outer end of which is pivotally connected to a rod 76, which is of adjustable length. The lower end of the rod 76 is adjustably secured by means of a bolt 77 to a slotted arm 78 which is pivoted at 79, and which carries at its end opposite to the bolt 77 a cam roller 80 engaging an impeller cam 81. The cam 81 is mounted on a shaft 82 which is driven continuously by means of any suitable power connections, not shown.

A compression spring 95 is connected between the hanger 65 and any convenient stationary support and acts in opposition to the cam 81 in reciprocating the impeller 62, the impeller being withdrawn from the outlet spout by the cam 81, and being moved toward the outlet spout by the spring 95, assisted by the weight of the lever 75, and of the connections between the lever 75 and the cam 81. The shaft 82 also carries a shear cam 83 which, through a cam roller 84, rocks a lever 85 upon a stationary pivot 86. The upper end of the lever 85 is connected by means of a link 86ª and a universal connection 87 to operate the shears 88. The construction and operation of the shears are best shown in Fig. 5. The shear blades 88 are removably carried by arms 89 that are mounted on vertical pivots 90 and are connected to move together by means of meshing gear segments 91. One of the arms 89 is provided with a projection 92 to which is attached one end of the universal connection 87. The other arm 89 is provided with a similar projection 93, to which is attached a spring 94, which acts in opposition to the cam 83, the spring serving to close the shears 88, and the cam serving to open the shears.

The amplitude of the stroke of the impeller 62 may be varied by changing the position of the pivot bolt 77 in the slot 96 of the arm 78, and other variations in the amplitude and speed of the impeller may be obtained by providing the cam 81 with removable or adjustable cam lobes, as described above.

The operation of the apparatus shown in Fig. 4 is similar in all respects to that of the apparatus of Fig. 3, except as to the adjustments mentioned.

Fig. 6 shows a modified construction in which the impeller may be employed not only for causing periodic discharges of glass, but also for the purpose of shutting off the discharge spout when it is desired to interrupt the feeding operation. As shown in this figure, a glass container 100 communicates with a discharge spout 101, having an orifice ring 102, as in Fig. 4. An impeller 103 is arranged to swing toward and from the inlet of the spout 101, and this impeller has a lateral projection 104 at its lower end. The projection 104 is conical and conforms to the shape of the inlet to the spout 101, so that when the impeller 103 is moved to the position shown in Fig. 6, the projection 104 of the impeller seats in the inlet of the spout and stops the flow of glass. It will, of course, be understood that in the normal reciprocation of the impeller to feed glass through the spout, the impeller is caused to stop before it reaches the seating position shown in Fig. 6.

The several structures shown and described above are intended as examples of the many ways in which my invention may be carried out, and I desire that no limitations be imposed upon my invention, except such as are indicated in the appended claims.

What I claim is:

1. Apparatus for feeding molten glass, comprising a container for the glass having a submerged lateral discharge outlet, an impeller disposed in said container and movable periodically toward and from said outlet, a spout block mounted adjacent to said outlet, clamps for removably securing said spout block in position, a spout projecting from said block and communicating with said outlet, said spout terminating in a downwardly opening discharge orifice, and means for severing mold charges from the glass issuing from said orifice.

2. Apparatus for feeding molten glass, comprising a container for the glass having a submerged lateral discharge outlet, an impeller disposed in said container and movable periodically toward and from said outlet, a spout block mounted adjacent to said outlet, a spout projecting from said spout block and terminating in a downwardly opening outlet, an orifice ring removably disposed adjacent to the outlet of said spout, and means for severing mold charges from the glass issuing from said orifice ring.

3. Apparatus for feeding molten glass, comprising a container for the glass having a submerged lateral discharge outlet, an impeller disposed in said container, means for moving said impeller periodically toward and from said outlet, a spout block mounted adjacent to said outlet, clamps for removably securing said spout block in place, a spout projecting from said spout block and communicating with said outlet, the said spout being curved outwardly and downwardly, and terminating in a downwardly opening orifice, an orifice ring mounted removably at the discharge end of said spout, an enclosure surrounding said spout, means for heating the interior of said enclosure, and shears for severing mold charges from the glass discharged from said orifice ring.

4. Apparatus for feeding molten glass, comprising a container for the glass having a submerged lateral discharge outlet, a spout communicating with said outlet and terminating in a downwardly opening orifice, an impeller disposed in said container and movable periodically toward and from said outlet, and means for supporting and reciprocating said impeller, comprising a hanger, a vertically adjustable support for said hanger, a lever connected to oscillate said hanger and cam operated connections for periodically moving said lever.

5. Apparatus for feeding molten glass, comprising a container for the glass having a submerged lateral discharge outlet, a spout communicating with said outlet and terminating in a downwardly opening orifice, an impeller disposed in said container and movable periodically toward and from said outlet, means for supporting and reciprocating said impeller, comprising a hanger, a vertically adjustable support for said hanger, a lever connected to oscillate said hanger, and cam operated connections for periodically moving said lever, shears for severing mold charges from the glass discharged at said spout, and cam operated means for operating said shears in timed relation to the movement of said impeller.

6. Apparatus for feeding molten glass, comprising a container for the glass having a submerged lateral discharge outlet and a laterally oscillatory impeller depending into the glass in the container and swingable periodically toward and from the outlet, the space between said impeller and the portion of the wall directly above said outlet enlarging in an upward direction.

7. Apparatus for feeding molten glass, comprising a container for the glass, a discharge spout having its inlet in communication with the interior of the container below the normal level of the glass in the container and a laterally oscillatory impeller depending into the glass in the container and swingable periodically toward and from the outlet, the wall confronting said impeller above the inlet end of said spout being inclined outwardly from the level of the spout inlet to a plane substantially above the normal level of the glass in the container.

Signed at Hartford, Conn., this 6th day of November, 1924.

KARL E. PEILER.